United States Patent Office 3,793,291
Patented Feb. 19, 1974

3,793,291
AROMATIC POLYIMIDES COMPRISING CARBINOL GROUPS, THEIR MANUFACTURE AND USES
Choua Cohen, Pierre Giuliani, and Bernard Sillion, Grenoble, France, assignors to Institut Francais du Petrole des Carburants et Lubrifiants, Rueil Malmaison, France
No Drawing. Continuation-in-part of abandoned application Ser. No. 9,409, Feb. 6, 1970. This application Aug. 16, 1972, Ser. No. 281,196
Claims priority, application France, Feb. 10, 1969, 6903109
Int. Cl. C08g 20/32
U.S. Cl. 260—47 CP    12 Claims

ABSTRACT OF THE DISCLOSURE

Soluble, high molecular weight, carbinol-containing polyimides provided by reacting meta- (or para-) phenylene-bis-(4-hydroxymethylene-phthalic acid), a diester or a tetraester thereof with a primary diamine at 100–400° C.

CROSS-REFERENCE TO RELATED APPLICATION

This application is a continuation-in-part of our co-pending application Ser. No. 9,409, filed Feb. 6, 1970, now abandoned.

This invention relates to new carbinol-containing aromatic polyimides, their manufacture and uses.

An object of this invention is to provide new carbinol-containing aromatic tetracarboxylic compounds (tetra-acids, diester-diacids and tetraesters), usable as starting materials for the manufacture of said new carbinol-containing aromatic polyimides.

Another object of the invention is to provide new carbinol-containing aromatic polyimides, which exhibit a good solubility in numerous organic solvents, in spite of their high molecular weight.

A further object of this invention is to describe processes for manufacturing said polyimides, as well as some uses thereof, particularly as raw materials for manufacturing composite materials, adhesive compositions, varnishes, molded materials, films, fibers and cellular materials.

It is well-known that polyimides cannot be manufactured and processed easily since they are insoluble and infusible. Conversely the polyimides of this invention are soluble in numerous organic solvents, although their molecular weight is high. This outstanding property is thought to be attributable to the carbinol groups joining the aromatic rings of their molecule. The polyimides of this invention also exhibit, in their various shapes, superior mechanical properties at high temperature. In addition, with respect to the manufacture of composite materials containing glass or silica fibers, there is exhibited a remarkable adhesivity of these new polyimides on glass or silica fibers and is believed due to the presence of these carbinol groups in their molecule.

The new carbinol-containing aromatic tetracarboxylic compounds of the invention are the following:

Meta-phenylene bis(4-hydroxymethylene phthalic acid) and para-phenylene bis(4-hydroxymethylene phthalic acid) respectively having the formulae:

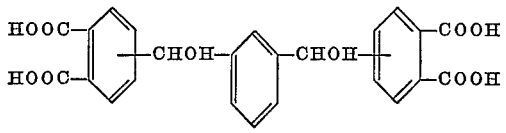
I-A and

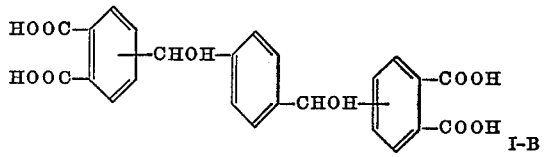
I-B

Diester-diacids and tetraesters of these two tetracarboxylic acids, respectively having the formulae:

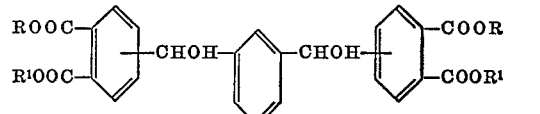
II-A

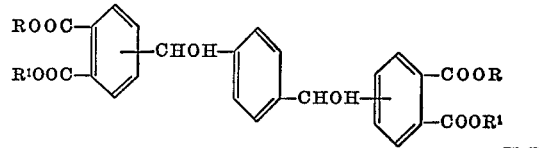
II-B in which R is a monovalent hydrocarbon radical, preferably containing 1–12 carbon atoms and R¹ is a hydrogen atom or a monovalent hydrocarbon radical, preferably containing 1–12 carbon atoms.

These tetracarboxylic compounds may be manufactured from compounds of general formulae:

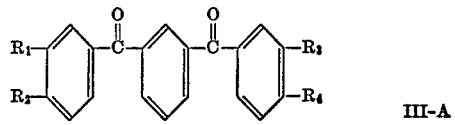
III-A and

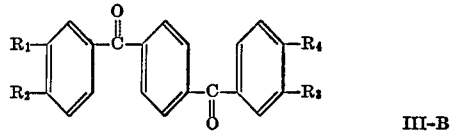
III-B in which $R_1$, $R_2$, $R_3$ and $R_4$ are identical or different alkyl radicals, each preferably containing 1–3 carbon atoms.

Several methods for manufacturing Compounds III (A or B) may be used; for example an organo-magnesium compound can be reacted with isophthalic (or terephthalic) dinitrile, or 1,3- (or 1,4-) bis-(chloromethyl)-benzene can be reacted with an ortho-dialkylbenzene under the conditions of a Friedel and Crafts' reaction, followed by an oxidation of the methylene groups. However, a preferred method consists of condensing iso-phthaloyl (or terephthaloyl) chloride with an ortho-dialkyl aromatic hydrocarbon in the presence of an acid catalyst according to Friedel and Crafts' method.

Ortho-xylene is preferred as the ortho-dialkyl aromatic hydrocarbon since its use results in a compound containing 4 methyl groups, i.e., a compound which loses the minimum of atoms during the subsequent oxidation to the tetra-acid.

Reference is made, for example, to OLAH's book "Friedel-Crafts and Related Reactions," vol. III, for a discussion of the well-known conditions of the Friedel and Crafts' reaction, the useful acid catalysts and solvents.

With reference to ortho-xylene, any excess of the latter may act as a solvent. The selected catalyst, for example, aluminum chloride used in a preferred amount of 2–3 moles per mole of acid chloride, is added, portionwise, to the solution of the acid chloride in ortho-xylene; the latter may be used in excess since any excess may be recovered by the end of the reaction.

The catalyst is added at such a rate that the temperature does not rise too fast, said temperature being advantageously maintained between 20 and 40° C. After termination of the catalyst addition, the temperature may be increased to a value between 40° C. and the boiling temperature of the mixture, preferably between 70 and 85° C., so as to complete the reaction. Finally, acidified water may be added and the formed product may be separated from any excess of ortho-xylene by distillation, or else by steam-stripping which also results in a complete hydrolysis of aluminum derivatives.

In this process, no isomerization of the alkyl substituents of the benzene ring takes place, contrary to what could be feared. Thus, the excess of ortho-xylene may be recycled after mere decantation and drying.

The tetra-alkyl compounds of Formula III (A or B) are thus obtained with a molar yield of 95–98%; they have a sufficient purity to be directly oxidized to the tetra-acids of the formulae:

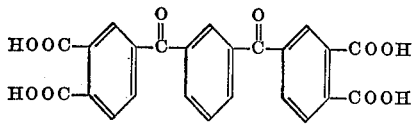
IV-A and

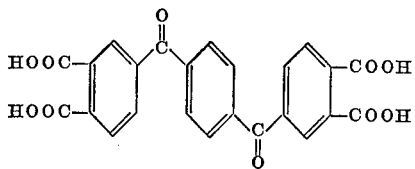
IV-B

This oxidation reaction, in particular with

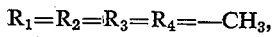

may be carried out according to most of the oxidation processes. For example, oxygen may be used together with cobalt catalysts. Such chemicals, as for example, potassium permanganate, may also be used, at first with pyridine, and then with sodium hydroxide. However, a preferred process consists of working with dilute nitric acid under pressure at a temperature between 100–200° C. A small excess of nitric acid may be used without trouble. The molar yield of tetra-acid is in the range of 95–98%.

From the sodium or potassium salts of the tetracarboxylic acids of Formulae IV (A and B), the meta- (and para-) phenylene bis(4-hydroxymethylene phthalic acid) of Formulae I (A and B) may be prepared, for example, by a catalytic hydrogenation of said salts, for example, in the presence of palladium.

The manufacturing of the diester-diacids of the Formulae II (A and B) wherein $R^1$ is the hydrogen atom may be carried out as follows:

The tetra-acid of the Formula IV (A or B) is dehydrated to the corresponding di-anhydride of the formula:

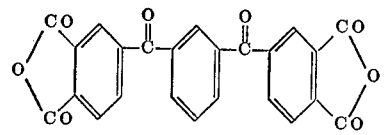
V-A

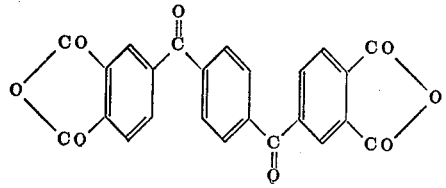
V-B according to any known technique. The preferred technique, however, consists of heating the tetra-acid for 2–8 hours at 70–90° C. in an excess of acetic anhydride. The product is then cooled down, filtered and dried under vacuum at 120–180° C. This results in the dianhydride of Formula V–A (M.P. 218° C.) or the dianhydride of Formula V–B (M.P. 278–279° C.) with a molar yield of 75–95%.

These dianhydrides are condensed with a hydroxy compound of the Formula R–OH to give a mixture of diester-diacid isomers of the general formula:

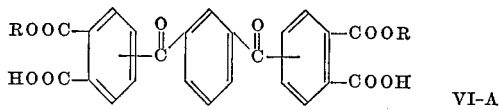
VI-A or

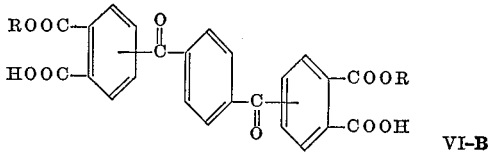
VI-B

The R–OH compound is selected from the aliphatic alcohols containing, for example, from 1–12 carbon atoms and the phenols containing, for example, from 6–12 carbon atoms.

The following hydroxy compounds may be used: examples of aliphatic alcohols are methanol, n-propanol, isopropanol, butanols, pentanols, hexanols, 2-ethyl hexanol, iso-octyl alcohol, lauric alcohol and allylic alcohol; an example of substituted aliphatic alcohol is cyano-ethanol; examples of phenols are ordinary phenol and substituted phenols such as the cresols.

The reaction is eventually conducted in the presence of a catalyst, for example, a tertiary amine.

The manufacturing of the tetraesters may be carried out by separating the excess of alcohol or phenol by distillation or extraction, and treating the diester-diacid with a chloride to obtain the corresponding diester-diacid chloride. This reaction is usually carried out with thionyl chloride, phosphorus chlorides or oxalyl chloride, by way of examples.

The diester-diacid chloride is thereafter reacted with an alcohol or a phenol, identical to or different from the alcohol or phenol used for manufacturing the diester-diacid.

Another method consists of treating the diester-diacid with diazomethane, so that the dimethyl tetraester is obtained.

Further, another method consists of reacting the tetra-acid IV (A or B) or the dianhydride V (A or B) with an excess of alcohol or phenol in a solvent such as benzene in the presence of a strong acid such as, for example, sulfuric acid or benzene-sulfonic acid. Water is continuously separated by distillation in the form of an azeotrope.

The diesters or the tetraesters of the Formulae VI (A and B) are thereafter hydrogenated, for example, in an alcohol, preferably methanol or ethanol, and in the presence of palladium on charcoal. This hydrogenation is generally carried out at a hydrogen pressure between 10–100 kg./cm.$^2$ and at a temperature lower than 60° C. Hydrogen is used in an amount which is approximately the theoretical amount.

The disappearance of the carbonyl group may be monitored by U.V. and I.R. spectrometry.

There are respectively obtained carbinol-containing aromatic diester-diacids and tetraesters of this invention.

These diester-diacids and tetraesters are usable as plasticizers and additives for lubricants. However, their most important use, as well as for the tetracarboxylic acids themselves, is as starting materials for the manufacturing of the polyimides of the invention.

The new carbinol-containing aromatic polyimides of this invention are characterized in that they contain recurring units of the formula:

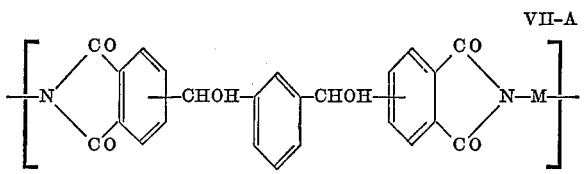
VII-A or recurring units of the formula:

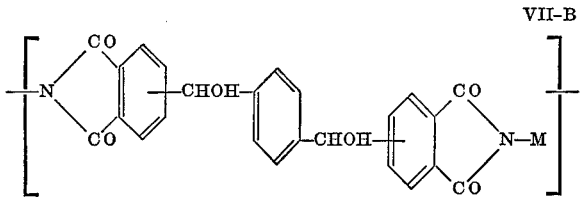
VII-B in which M is an aliphatic, alicyclic, aromatic or alkyl aromatic, carbocyclic or heterocyclic divalent radical, preferably containing from 6–30 carbon atoms.

This radical may be substituted with various radicals or atoms, for example, fluorine or chlorine atoms, alkyl or alkoxy groups, in particular, methyl and methoxy.

The polyimides of the present invention have an inherent viscosity of at least 0.10, preferably at least 0.20 dl./g., as measured in a 0.5% by weight solution in N-methylpyrrolidone at 30° C.

In the Formulae VII (A and B), M may particularly be a radical —$Ar_1$—X—$Ar_2$— in which $Ar_1$ and $Ar_2$ are aromatic or cycloaliphatic divalent radicals and X is a single bond or is selected from the group consisting of —$C_nH_{2n}$—, —$[C(A)_2]_n$—, —$(CF_2)_n$—, —CO—, —COO—,

—CONH—, —O—, —S—, —SO—, —$SO_2$—, —NH—,

—NA—, —Si($AA^1$)—, —O—Si($AA^1$)—O—,

—P(A)(O)— and

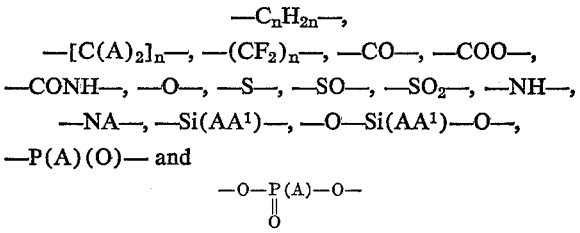

in which $n$ is an integer from 1 to 3, and A and $A^1$ are alkyl radicals such as methyl or ethyl, or aryl radicals such as phenyl.

For example, the radical M is derived from metaphenylene diamine,
paraphenylene diamine,
4,4'-di-amino-diphenyl propane,
4,4'-diamino-diphenyl methane, benzidine,
4,4'-diamino-diphenyl sulfide,
4,4'-diamino-diphenyl sulfone,
3,3'-diamino-diphenyl sulfone,
4,4'-diamino-diphenyl ether,
2,6-diamino-pyridine,
bis-(4-amino-phenyl)diethyl silane,
bis-(4-amino-phenyl)diphenyl silane,
3,3'-dichloro-benzidine,
bis-(4-amino-phenyl)ethyl phosphine oxide,
bis-(4-amino-phenyl)phenyl-phosphine oxide,
bis-(4-amino-phenyl)-N-phenyl amine,
bis-(4-amino-phenyl)-N-methyl amine,
1,5-diamino-naphthalene,
3,3'-dimethyl-4,4'-diamino-biphenyl,
3,4'-dimethyl-3',4-diamino-biphenyl,
3,3'-dimethoxy-benzidine,
2,4-bis(β-amino-t-butyl)toluene,
bis(para-β-amino-t-butyl-phenyl)ether,
para-bis-(2-methyl-4-amino-pentyl)benzene,
para-bis-(1,1-dimethyl-5-amino-pentyl)benzene,
m-xylylene diamine,
p-xylylene diamine,
1,3-diamino adamantane,
3,3'-diamino-1,1'-diadamantane,
3,3'-diaminomethyl-1,1'-diadamantane,
bis(para-amino-cyclohexyl)methane,
hexamethylene diamine,
heptamethylene diamine,
octamethylene diamine,
nonamethylene diamine,
decamethylene diamine,
3-methylheptamethylene diamine,
4,4-dimethylheptamethylene diamine,
2,11-diamino-dodecane,
1,2-bis-(3-amino-propoxy) ethane,
2,2-dimethyl propylene diamine,
3-methoxy-hexamethylene diamine,
2,5-dimethylhexamethylene diamine,
2,5-dimethylheptamethylene diamine,
5-methylnonamethylene diamine,
1,1-diamino-cyclohexane,
1,12-diamino-octadecane,
2,5-diamino-1,
3,4-oxadiazole,
2,2-bis(4-aminophenyl)hexafluoro propane,
N-(3-aminophenyl)-4-aminobenzamide,
4,4'-diamino-benzophenone, or
4-aminophenyl-3-amino benzoate.

The polyimides, according to this invention, may be obtained by poly-condensation of the mixture of isomeric diester-diacid described hereabove and a primary diamine at a temperature usually between 100 and 400° C.

The diamines used are represented by the following formula:

$$NH_2—M—NH_2$$

in which M is a divalent organic radical as defined hereabove.

Among the diamines that may be used in this invention, the following can be cited:

metaphenylene diamine,
paraphenylene diamine,
4,4'-diamino-diphenyl propane,
4,4'-diamino-diphenyl methane, benzidine,
4,4'-diamino-diphenyl sulfide,
4,4'-diamino-diphenyl sulfone,
3,3'-diamino-diphenyl sulfone,
4,4'-diamino-diphenyl ether,
2,6-diamino-pyridine,
bis-(4-amino-phenyl)diethyl silane,
bis-(4-amino-phenyl)diphenyl silane,
3,3'-dichloro-benzidine,
bis-(4-amino-phenyl)ethyl phosphine oxide,
bis-(4-amino-phenyl) phenyl phosphine oxide,
bis-(4-amino-phenyl)-N-phenyl amine,
bis-(4-amino-phenyl)-N-methyl amine,
1,5-diamino-naphthalene,
3,3'-dimethyl-4,4'-diamino-biphenyl,
3,4'-dimethyl-3',4-diamino-biphenyl,
3,3'-dimethoxy-benzidine,
2,4-bis(β-amino-t-butyl)toluene,
bis-(para-β-amino-t-butyl-phenyl)ether,
para-bis-(2-methyl-4-amino-pentyl)benzene,
para-bis-(1,1-dimethyl-5-amino-pentyl)benzene,
m-xylylene diamine,
p-xylylene diamine,
1,3-diamino adamantane,
3,3'-diamino-1,1'-diadamantane,
3,3'-diaminomethyl-1,1'-diadamantane,
bis(para-amino-cyclohexyl)methane,
hexamethylene diamine,
heptamethylene diamine,
octamethylene diamine,
nonamethylene diamine,
decamethylene diamine,
3-methylheptamethylene diamine, 4,4-dimethylheptamethylene diamine,
2,11-diamino-dodecane,
1,2-bis-(3-amino-propoxy)ethane,
2,2-dimethyl propylene diamine,
3-methoxy-hexamethylene diamine,
2,5-dimethylhexamethylene diamine,
2,5-dimethylheptamethylene diamine,
5-methylnonamethylene diamine,
1,1-diamino-cyclohexane,
1,12-diamino-octadecane,
2,5-diamino-1,3,4-oxadiazole,
2,2-bis(4-aminophenyl)hexafluoro propane,
N-(3-aminophenyl)-4-aminobenzamide,
4,4'-diamino-benzophenone, and
4-aminophenyl-3-amino benzoate.

The diester-diacid and the diamine may be reacted in substantially stoichiometrical amounts. However, for specific uses, for example, the manufacture of adhesive compositions, an excess of the diamine, such as 5 to 50 mols of diamine per 100 mols of diester, may be advantageous.

The poly-condensation reaction may be carried out with the molten or dissolved reactants.

The preferred solvents are polar solvents substantially non-reactive with respect to the monomers and the polymers and able to dissolve the polymers up to a given conversion degree.

These solvents may be used, for example, at their boiling temperature or at a higher temperature in an autoclave.

By way of examples, dimethylformamide, dimethylacetamide, N-methyl pyrrolidone, dimethylsulfoxide, hexamethylphosphoramide, pyridine, quinoline, phenol, cresols and chlorophenols may be mentioned. These solvents may be used individually or as mixtures; less active solvents such as benzene, toluene, xylene, dioxane and cyclohexane may be added thereto.

The reaction temperature is preferably in the range of 150 to 250° C.

When working in the molten state of the monomers, the latter are heated up to a temperature from 150° C. to 400° C.

In the two cases, the polymerization reaction proceeds with the release of such volatile products as water and alcohol, and the latter may be removed in an intermediate stage.

Irrespective of the initial conditions, the reaction may be completed with a treatment under reduced pressure or in inert atmosphere at a temperature from 200 to 400° C. During this treatment, the conversion to imides is completed, thus resulting in thermostable high polymers.

In some cases, it may be advantageous to isolate a polymer of low molecular weight, which is solid and can be melted. This pre-polymerization is carried out either in solution or in the molten state at an average temperature between 100 and 220° C. The reaction is terminated when the inherent viscosity, determined at 30° C. on a 0.5% by weight solution in N-methyl pyrrolidone, is between 0.06 and 0.70 dl./g. and preferably between 0.15 and 0.30 dl./g. During this treatment, it is often advantageous to separate the major part of the solvent. The process is thus carried out more easily.

According to this invention, polyimides may also be obtained by the poly-condensation of a tetraester of Formula II (A or B) hereabove, wherein both R and $R^1$ are monovalent hydrocarbon radicals, preferably containing 1 to 12 carbon atoms, with a primary diamine as previously defined.

A mixed aliphatic and aromatic tetraester is preferably used which makes possible to utilize the different reactivities of these two kinds of groups.

The polyimide may be obtained by heating at 200–300° C. the tetraester and the diamine, this resulting in a molten composition. The heating may be interrupted before the viscosity attains 0.7 and preferably 0.2 dl./g. A composition of relatively low molecular weight is thus obtained. This composition may be transformed to a high molecular weight polyimide by further heating at 200 to 400° C., preferably under reduced pressure or in an inert atmosphere.

The solutions of monomers may be modified by adding other monomeric or pre-polymeric compositions up to a proporiton of 50%. Inert constituents may also be added, such as pigments, dyes, inorganic or organic fillers, metal fillers, adhesive powders or stabilizing agents with respect to heat and oxidation.

It is also possible to prepare the polyimides of the invention directly from meta-(or para-) phenylene bis(4-hydroxymethylene phthalic acid), by heating said acid with the diamine in a polar solvent, for example, dimethyl formamide, dimethyl sulfoxide, dimethyl acetamide, N-methylpyrrolidone, pyridine, phenol or cresols. The reaction is generally conducted at a temperature above 100° C., preferably between 100 and 250° C., until a solution having a sufficient viscosity is obtained, said viscosity, measured as the inherent viscosity at 25° C. in a 0.5% by weight solution in metacresol, being usually from 0.2 to 2.0 dl./g.

Addition of benzene, toluene or cyclohexane is desirable for removing the water formed during the reaction.

It is further possible to use, instead of the diamines, N,N'-diacyl derivatives thereof, with meta-(or para-) phenylene bis(4-hydroxymethylene phthalic acid).

The polyimides of this invention may be used in the preparation of matrix for composite materials and in the preparation of adhesive compositions, insulating varnishes, molded materials, films or fibers. Cellular products such as foam may also be manufactured.

The following examples illustrate the invention:

EXAMPLE 1

Preparation of meta-bis(3,4-dimethylbenzoyl)benzene 603 g. of isophthaloyl chloride (3 moles) are dissolved in 6 liters of ortho-xylene, and 798 g. (6 moles) of aluminum chloride are stepwise added thereto. During the addition of aluminum chloride, the temperature is maintained at 20–25° C. by means of a cooling bath. The condensation is terminated by heating at 85° C. for 2 hours. The product is then cooled down to 30° C. and hydrolyzed by means of ice and 25 cc. of concentrated hydrochloric acid.

The hydrolysis is terminated by steam-stripping so as to eliminate ortho-xylene acting as solvent. The latter must be separated completely since the synthesis product is very soluble in ortho-xylene. After cooling, the precipitate is filtered, washed with water up to neutrality, and then with alcohol, and finally dried. The molar yield of product melting at 137–138° C. is 94%.

EXAMPLE 2

Meta-bis(3,4-dicarboxybenzoyl)benzene 68.4 g. (0.2 mole) of the tetra-methyl product of Example 1 are admixed with 250 cc. of dilute nitric acid (125 cc. of nitric acid of sp.w. 1.38 together with 125 cc. of water).

The oxidation is carried out in an autoclave under pressure at 150° C. for 3 hours. After cooling, the yellowish green product is collected. The nitrogenous vapors are separated by means of an air stream. The solution of the tetra-acid is evaporated to dryness and dried. The molar yield is 95%.

The I.R. spectrum shows acid groups and anhydride groups indicating some dehydration during the evaporation.

EXAMPLE 3

Dianhydride of meta-bis(3,4-dicarboxybenzoyl)benzene 90 g. of the tetra-acid produced by Example 2 are admixed with 500 cc. of acetic anhydride. The mixture is heated for 4 hours at 90° C., then cooled down to −20° C. and kept under crystallization conditions for 24 hours. The product is filtered and dried at 150° C. under 20 torrs pressure. 82.6 g. of product are obtained whose M.P. is 218° C. The molar yield of dianhydride is 84.6%.

The I.R. spectrum shows anhydride absorptions at 1770 and 1855 cm.$^{-1}$.

EXAMPLE 4

Methyl hemiester of meta-bis(3,4-dicarboxybenzoyl) benzene 54.4 g. of the dianhydride produced by Example 3 are boiled for 4 hours in 300 cc. of anhydrous methanol. The product is filtered when hot; it is then evaporated to dryness and dried. 49.9 g. of a mixture of the isomeric methyl di-esters is thus obtained. The molar yield is 80%.

The infrared spectrum shows carbonyl groups of the ester type and no longer anhydride groups.

EXAMPLE 5

Hemiester of meta-phenylene bis(4-hydroxymethylene phthalic acid)

50 g. of the methyl diesters produced by Example 4 are admixed in an autoclave with 600 cc. of anhydrous methanol and 2.5 g. of palladium on charcoal (percent Pd: 5). The hydrogenation is conducted at room temperature and 50 bars for 2 hours.

Palladium is filtered, the liquid phase is evaporated to dryness. The weight of product of 46.9 g. The molar yield of methyl hemiesters of meta-phenylene bis(4-hydroxymethylene phthalic acid) is 93.5%, the I.R. spectrum shows no peak at 1660 cm.$^{-1}$, corresponding to the C=O group.

EXAMPLE 6

Synthesis of para-bis-(3,4-dimethyl-benzoyl)benzene

Into a 1-liter flask, there are introduced 135 cc. of orthoxylene, and then 70 g. of finely divided aluminum chloride. The mixture is agitated for 30 minutes to obtain a brownish red solution. Into this solution there is introduced a second solution during a period of 1 hour, this second solution being prepared by admixing 40 g. of terephthaloyl chloride and 100 cc. of orthoxylene, at a temperature of 7–12° C. The resultant mixture of the two solutions is then heated at 60° C. for about ½ hour and then at 90° C. for another half hour. After cooling, excess orthoxylene is removed by vacuum distillation under 1 mm. Hg.

Into the resultant mixture freed of orthoxylene, there is slowly introduced 250 cc. of water, maintaining the temperature at about 30° C. There is thus formed a white precipitate which is filtered, and washed with 400 cc. of alcohol and then with a small quantity of ether. The residual solid which melts at 177° C. is dissolved in 1200 cc. of boiling methylethylketone containing 5 g. of carbon black. The solution is filtered while warm and then the filtrate is then allowed to cool to form a further precipitate which is again filtered, washed with ether, and dried at 70–75° C. for several hours under a vacuum of 100 mm. Hg.

The resultant product, 56.5 g. of para-bis-(3,4-dimethyl-benzoyl)-benzene, is a white solid melting at 178° C.

EXAMPLE 7

Para-bis(3,4-dicarboxy-benzoyl)-benzene

Into a 1 liter autoclave there are introduced 17.1 g. of para-bis-(3,4-dimethyl-benzoyl)-benzene, 75 g. of sodium bichromate dihydrate and 350 cc. of water. The mixture is heated at 250° C. under agitation for 5½ hours, and after cooling, the resultant precipitate is filtered. Into the filtrate, there is introduced a solution made by adding 70 cc. of 10 N hydrochloric acid and 60 cc. of water, and there is thus obtained a white flocculant precipitate which is then filtered and washed with 350 cc. of water.

The residual solid is recrystallized by dissolution in boiling water, then slow cooling at 7° C. The precipitate is filtered, washed with water, and dried at 60° C. overnight under 1 mm. mercury, resulting in 15.1 g. of para-bis-(3,4-dicarboxybenzoyl)-benzene, a white solid melting at 291° C.

EXAMPLE 8

Dianhydride of para-bis(3,4-dicarboxy-benzoyl)-benzene

At 200° C., there is heated 10.5 g. of the final product of Example 7 for 9 hours, thereby producing 9.7 g. of the dianhydride thereof. This product is a white solid melting at 278–279° C.

EXAMPLE 9

Methyl hemiesters of para-bis-(3,4-dicarboxy-benzoyl)-benzene

Ten g. of the dianhydride produced by Example 8 is boiled for 3 hours under reflux conditions in 100 cc. of methanol in the presence of 1 cc. of triethylamine. The resultant solution is then evaporated under vacuum, thereby producing 9 g. of a mixture of methyl diesters in the form of a white solid. By infrared analysis, it is seen that the product does not exhibit an anhydride band, but instead there is shown an acid and ester band.

EXAMPLE 10

Hemiesters of p-phenylene bis-(4-hydroxymethylene-phthalic acid)

Into a 1-liter autoclave, there is introduced 50 g. of the diester-diacid obtained according to Example 9, 300 cc. of methanol and a suspension of 2 g. of palladium deposited on carbon black in 300 cc. of methanol. A hydrogenation reaction is then conducted by introducing hydrogen into the autoclave for a period of 2½ hours under a pressure of 40 bars and at ambient temperature. After the reaction, the catalyst is filtered out and the methanol evaporated. The yield of the hemiesters is 94%. The identification of the hemiesters of p-phenylene bis-(4-hydroxymethylene-phthalic acid) is conducted by infrared analysis wherein there no longer appears at 6.0μ the groups Ar-CO-Ar.

EXAMPLE 11

This example relates to reacting the hemiester of Example 5 with oxydianiline(4,4′-diamino-diphenylether).

Freshly sublimed oxydianiline and distilled N-methyl pyrrolidone are used. The polymerization is conducted in a stirred solution under an inert atmosphere. The reaction vessel is heated in an oil bath. The polymerization time is varied according to the desired use of the polymer.

Several experiments were carried out, each using 4 g. of the hemiester and 1.619 g. of oxydianiline. 25.6 g. of methyl pyrrolidone have been added thereto.

|  | Time, hours | Temperature, °C. | $\eta$ inh.,* dl./g. |
| --- | --- | --- | --- |
| (a) | 2 | 220 | 0.47 |
| (b) | 4½ | 220 | 0.59 |
| (c) | 7½ | 220 | 0.61 |
| (d) | 2 | 175 | 0.28 |
| (e) | 0 | 25 | 0.06 |

*The inherent viscosity was determined at 30° C. as a 0.5% by weight of solution in methyl pyrrolidone.

EXAMPLE 12

Example 11 is repeated except that oxydianiline was substituted with 1.603 g. of methylenedianiline.

(a) After 30 minutes in a bath at 175° C., the inherent viscosity of 0.5% and 30° C. is 0.14 dl./g.

(b) After 7 hrs. and a half at 220° C., the obtained dark yellow viscous solution had an inherent viscosity of 0.94 dl./g.

EXAMPLE 13

(a) The viscous solution (b) of Example 11 is used to form a film on a glass plate. It is dried at 110° C. in an air stream and the temperature is increased to 300° C. This results in a flexible yellow film which adheres strongly to the glass.

The I.R. spectrum shows peaks at 1725 and 1780 cm.$^{-1}$ which are characteristic of the imide group.

(b) The solution manufactured as described in Example 12 (b) is used to form a film which is treated as described in (a). The resulting film is strong and flexible but separates easily from the glass.

EXAMPLE 14

80 g. of methyl hemiesters of meta phenylene bis-(4-hydroxymethylene phthalic acid) and 32.06 g. of methylenedianiline are reacted in N-methyl pyrrolidone as described in Example 12 (a). The resulting 50% solution of the polymer is N-methyl pyrrolidone has an inherent viscosity of 0.19 dl./g. It is used to impregnate a glass tissue E–181 A–1100. After impregnation, it is dried at 80° C. for 16 hours in an air stream. This results in an impregnated cloth containing 43% polymer. Several laminates were manufactured as follows:

(a) 8 layers of cloth are piled up and placed between the plates of a press heated at 120° C.; the material is maintained for 5 minutes between plates of a 3 mm. thickness. The plates are then removed and a pressure of 14 bars is applied thereon. A temperature of 300° C. is maintained for 30 minutes. Pressure is maintained during cooling.

The resulting translucent light yellow laminate of 1.5 mm. thickness contains 20% of resin and 13.3% of void space. Its specific weight is 1.91. It withstands 75.9 hectobars in flex tests at room temperature.

(b) 8 sheets of cloth were piled up and introduced between the plates of a press at 250° C. The material is maintained for 5 minutes between plates of 3 mm.; the plates are removed and a pressure of 14 bars is applied thereto. A temperature of 350° C. is applied and maintained for 3 hours. The material is then cooled under pressure.

This results in a brown laminate of 1.7 mm. thickness which contains 25% of resin and 10.5% of vacuum. Its specific weight is 1.86. It withstands 69.5 hectobars in flex tests at room temperature.

EXAMPLE 15

Solutions of polymers manufactured as described in Example 11 have been used to join titanium according to ASTM standard D–1002–64.

Ribbons of titanium of 102.4 x 25.4 x 1.6 mm. were degreased with trichloromethylene and then dried. (They were immersed for 2 minutes in an aqueous solution of hydrochloric acid, phosphoric acid and hydrofluoric acid. They were also washed with tap water and dried at 90° C.)

Aluminum powder and arsenic thioarsenate were added to the solution of the used polymer and the whole was crushed finely. The obtained adhesive composition was used to impregnate a glass cloth E type 112–112 with as many sheets as required to have a material of 400 g./m.$^2$ weight; each sheet was dried at 110° C. The degreased ends of the ribbons were painted on one face with 2 sheets of the adhesive composition and finally dried at 110° C.

The painted ribbons are joined two by two in order to cover 12.7 mm. An impregnated cloth of 22.7 x 35 mm. is placed between the two ribbons and has 5 mm. free around the joined section. The composition is formed by heating at 325° C. and 5 bars for 1 hr. 30 and then reheated for 8 hours at 300° C. and 5 hours at 325° C.

The resulting compositions subjected to a traction test were drawn at a rate of 1.25 mm. per minute. The results of the test expressed in bars, as given herebelow, were obtained after a 10-minute exposure.

| Resin | $\eta$ inh., dl./g. | Bars at— | | | |
|---|---|---|---|---|---|
| | | −55° C. | 250° C. | 300° C. | 316° C. |
| Example 11(e) | 0.06 | 124 | 165 | 90 | 91 |
| Example 11(d) | 0.28 | 134 | 158 | 120 | 92 |
| Example 11(a) | 0.47 | 170 | 133 | 40 | 37 |
| Example 11(c) | 0.61 | 110 | 134 | 70 | 53 |

EXAMPLES 16 TO 20

Example 11 was repeated, except that oxydianiline was substituted with an equivalent amount of the following diamines:

meta-phenylene diamine,
4,4′-diamino diphenyl sulfone,
4,4′-diamino diphenyl sulfide, benzidine,
4,4′-diamino benzophenone.

In these examples, the temperature was 220° C. and the viscosity was determined after 2 hours and 4 hours and a half (at 30° C. on a 0.5% by weight solution in N-methyl pyrrolidone).

The results are the following:

| Number of example | Diamine | Inherent viscosity (dl./g.) | |
|---|---|---|---|
| | | After 2 hr. | After 4½ hr. |
| 16 | Meta-phenylene diamine | 0.25 | 0.43 |
| 17 | 4,4′-diamo diphenyl sulfone | 0.31 | 0.52 |
| 18 | 4,4′diamino diphenyl sulfide | 0.29 | 0.53 |
| 19 | Benzidine | 0.33 | 0.49 |
| 20 | 4,4′diamino benzophenone | 0.27 | 0.46 |

The obtained viscous solutions were used as described in Examples 13 to 15 for manufacturing films, laminates and adhesives.

The mechanical properties of these materials are substantially the same as those mentioned in Examples 13 to 15.

EXAMPLE 21

Into a 250-cc. reactor there are introduced:

9.328 g. of metaphenylene bis-(4-hydroxymethylenephthalic) acid,
4.006 g. of 4,4′-diamino-diphenylether, and
70 g. of metacresol.

The mixture is heated under agitation at 130° C. for 5 hours, the resultant mixture having an inherent viscosity of 0.22 dl./g., measured at 25° C. as an 0.5% by weight concentration in metacresol. The mixture is then further heated for a period of 1 hour at 160° C., the inherent viscosity being thus increased to 0.76 dl./g. measured under the same conditions. The resultant mixture is then admixed to toluene, with the polymer being isolated by precipitation. The isolated polymer is substantially identical to the polymer obtained by Example 11, in exhibiting characteristic imide and alcohol functions.

EXAMPLE 22

There are introduced into a 250-cc. reactor the following reactants:

9.328 g. of metaphenylene bis-(4-hydroxymethylenephthalic acid),
3.966 g. of 4,4′-diamino-diphenylmethane, and
70 g. of metacresol.

The mixture is heated to 130° C. for a period of 2 hours under agitation, the resultant inherent viscosity of the mixture being 0.37 dl./g., and after heating for a further hour at 165° C., an inherent viscosity of 1.30 dl./g. (the inherent viscosity is measured as in Example 21). The viscous solution is then deposited on a glass plate where it is heated to 120° C. to form a film, and then to 300° C. to harden same.

EXAMPLE 23

The same ingredients as in Example 21 are introduced into the reactor except dimethylacetamide is used to replace metacresol. The inherent viscosities, however, are measured in the same manner as in Example 21.

The mixture is heated under agitation for a period of 2 hours and 30 minutes at 130° C., then for 2 hours at 160° C., the final resultant inherent viscosity being 0.26 dl./g. The polyimide is then isolated by precipitation from toluene.

EXAMPLE 24

Polyimide obtained by reacting the hemiester of p-phenylene bis-(4-hydroxymethylene-phthalic acid) and 4,4'-diamino-diphenyl ether Into a 250-cc. reactor, there is introduced a mixture of 10.00 g. of the hemiester obtained according to Example 10, 4.05 g. of 4,4'-diamino-diphenylether, and 80 g. of distilled N-methyl-pyrrolidone. The mixture is agitated under a nitrogen atmosphere and it is heated in a molten metal bath at 220° C. for a period of 4 hours. The resultant inherent viscosity of the viscous solution is 0.7 dl./g., measured at a concentration of 0.5 g. in 100 g. of N-methylpyrrolidone at 25° C.

The polymer is isolated from the viscous solution by precipitation in toluene under strong agitation. Infrared spectrographic analysis indicates the presence of characteristic bands of the imide function at 5.62 and 5.82μ (and characteristic bands of the alcohol function at 2.9 and 9.6μ).

The polymer can also be obtained in form of a film by depositing the viscous solution on a glass plate and permitting it to dry at 120° C. and then raising the temperature to 300° C.

EXAMPLE 25

A polyimide produced by reacting p-phenylene bis-(4-hydroxy-methylene-phthalic acid) and 4,4'-diamino-diphenylether in m-cresol Into a 250-cc. reactor there are introduced the following products:

9.328 g. of p-phenylene bis-(4-hydroxymethylene-phthalic acid)
4.006 g. of 4,4'-diamino-diphenylether, and
70 g. of metacresol.

This mixture is heated under agitation at 130° C. for 5 hours to obtain a final product exhibiting an inherent viscosity at 25° C. of 0.22 dl./g., measured at a concentration of 0.5 g. per 100 cc. of metacresol. Further heating of the viscous solution is conducted for 1 hour at 160° C., thereby increasing the inherent viscosity to 0.75 dl./g., measured under the same conditions.

The resultant polymer is isolated by precipitating in toluene under strong agitation, and is then examined by infrared analysis wherein the characteristic bands of imide and alcohol functions are seen.

EXAMPLE 26

The viscous solution prepared according to Example 25 is utilized to glue stainless steel according to the standards set forth in ASTM D-1002-64. Stainless steel plates measuring 100 x 25 x 2 mm. are degreased in acetone and then in trichloroethylene vapor. They are then pickled for 10 minutes in a bath of hydrochloric, phosphoric and hydrofluoric acids, and are finally thoroughly rinsed in distilled water and dried at 70° C. in an oven.

The resultant stainless steel plates are coated on a length of about 20 mm. with the viscous solution of Example 25 using two coatings with intermediate drying at 100° C. in an oven. After the last coating is applied, the plates are dried for 1½ hours at 100° C. The coated plates are placed in a mold so that 2 plates have an overlapping surface of 25 x 12.5 mm.

EXAMPLE 27

Polyimide obtained by reacting p-phenylene bis-(4-hydroxymethylene-phthalic acid) and 4,4'-diamino-diphenylmethane in m-cresol Into a 250-cc. reactor there are introduced the following reactants:

9.328 g. of p-phenylene bis-(4-hydroxymethylene-phthalic acid),
3.966 g. of 4,4'-diamino-diphenylmethane, and
70.00 g. of m-cresol.

The resultant mixture is heated under agitation for 2 hours at 130° C., the resultant inherent viscosity being 0.37 dl./g. The mixture is further heated for 1 hour at 165° C. to attain an inherent viscosity of 1.29 dl./g. A polymeric film is obtained by depositing the resultant solution on a glass plate, and then heating the solution first to 180° C., and then to 300° C.

EXAMPLE 28

Polyimide produced by reacting p-phenylene bis-(4-hydroxymethylene-phthalic acid) and 4,4'-diamino-diphenylether in dimethyl-acetamide Into a reactor there is charged the following components:

9.328 g. of p-phenylene bis-(4-hydroxymethylenephthalic acid),
4.006 g. of 4,4'-diamino-diphenylether, and
70.00 g. of dimethylacetamide.

The mixture is heated under agitation for 2½ hours at 130° C., and then for 2 hours at 160° C., the inherent viscosity of the final product being 0.25 dl./g.

The polymer is isolated by precipitating the viscous solution in strongly agitated toluene. The resultant polymer exhibits an infrared spectrum identical to that polymer obtained according to Example 25.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A carbinol-containing aromatic polyimide containing recurring units having one of the formulae:

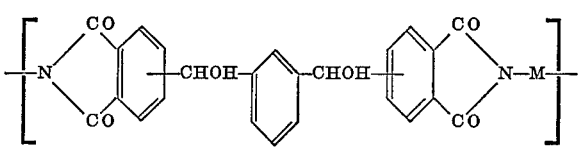

and

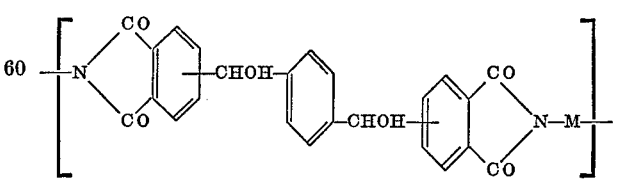

in which M is selected from aliphatic, alicyclic, carbocyclic and heterocyclic aromatic and alkyl aromatic divalent radicals, and having an inherent viscosity of at least 0.1 dl./g., as measured in a 0.5% by weight solution in N-methyl pyrrolidone at 30° C.

2. A polyimide as defined by claim 1, wherein M is

—$Ar_1$—X—$Ar_2$— in which $Ar_1$ and $Ar_2$ are aromatic or cycloaliphatic divalent radicals and X is a single bond or is selected from the group consisting of: $-C_nH_{2n}-$, $-[C(A)_2]_n-$, $-(CF_2)_n-$, $-CO-$, $-COO-$, $-CONH-$, $-O-$, $-S-$, $SO-$, $-SO_2-$, $-NH-$, $-NA-$, $-Si(AA^1)-$, $-O-Si(AA^1)-O-$,

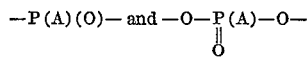

in which n is an integer from 1 to 3, A and $A_1$ are lower alkyl or phenyl.

3. A polyimide as defined by claim 1, wherein M is derived from a primary diamine of formula $H_2N-M-NH_2$ selected from the group consisting of metaphenylene diamine, paraphenylene diamine, 4,4′-diamino-diphenyl propane, 4,4′-diamino-diphenyl methane, benzidine, 4,4′-diamino-diphenyl sulfide, 4,4′-diamino-diphenyl sulfone, 3,3′-diamino-diphenyl sulfone, 4,4′ - diamino-diphenyl ether, 2,6-diamino-pyridine, bis-(4-amino-phenyl) diethyl silane, bis-(4-amino-phenyl)diphenyl silane, 3,3′-dichloro-benzidine, bis-(4-amino-phenyl)ethyl phosphine oxide, bis-(4-amino-phenyl)phenyl phosphine oxide, bis-(4-amino-phenyl)-N-phenyl amine, bis-(4-amino-phenyl)-N-methyl amine, 1,5-diamino-naphthalene, 3,3′-dimethyl-4,4′-diamino-biphenyl, 3,4′-dimethyl - 3,4′ - diamino-biphenyl, 3,3′-dimethoxy-benzidine, 2,4 - bis($\beta$-amino-t-butyl)toluene, bis - (para-$\beta$-amino-t-butyl-phenyl)ether, para-bis-(2-methyl - 4-amino-pentyl)benzene, para-bis-(1,1-dimethyl-5-amino-pentyl)benzene, m-xylylene diamine, p-xylylene diamine, 1,3-diamino adamantane, 3,3′-diamino-1, 1′-diadamantane, 3,3′-diaminomethyl-1,1′-diadamantane, bis(para-amino-cyclohexyl)methane, hexamethylene diamine, heptamethylene diamine, octamethylene diamine, nonamethylene diamine, decamethylene diamine, 3-methylheptamethylene diamine, 4,4-dimethyl-heptamethylene diamine, 2,11-diamino-dodecane, 1,2-bis-(3-amino-propoxy)ethane, 2,2-dimethyl propylene diamine, 3-methoxy-hexamethylene diamine, 2,5-dimethyl-hexamethylene diamine, 2,5-dimethylheptamethylene diamine, 5-methylnonamethylene diamine, 1,1-diamino-cyclohexane, 1-12-diamino-octadecane, 2,5-diamino-1,3,4-oxadiazole, 2,2-bis(4-aminophenyl)hexafluoro propane, N-(3-aminophenyl)-4-aminobenzamide, 4,4′ - diamino-benzophenone and 4-aminophenyl-3-amino benzoate.

4. A process for manufacturing an aromatic polyimide as defined by claim 1, comprising reacting, at a temperature from 100 to 400° C., at least an ester of one of the formulae:

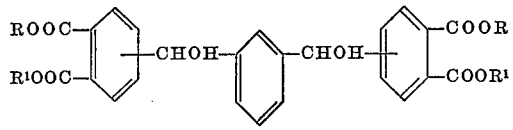

and

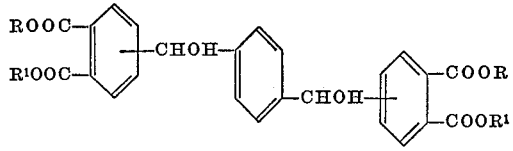

in which R is a monovalent hydrocarbon radical and $R^1$ is selected from the hydrogen atom and monovalent hydrocarbon radicals, with at least one primary diamine of the formula $NH_2-M-NH_2$, in which M is selected from aliphatic, alicyclic, carbocyclic and heterocyclic aromatic and alkyl aromatic divalent radicals non-interfering with the reaction.

5. The process of claim 4 wherein M is

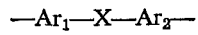

in which $Ar_1$ and $Ar_2$ are aromatic or cycloaliphatic divalent radicals and X is a single bond or is selected from the group consisting of:
$-C_nH_{2n}-$, $-[C(A)_2]_n-$, $-CF_2)_n-$, $-CO-$, $-COO-$, $-CONH-$, $-O-$, $-S-$, $SO-$, $-SO_2-$, $-NH-$, $-NA-$, $-Si(AA^1)-$, $-O-Si(AA^1)-O-$,

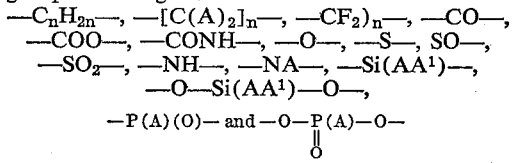

in which n is an integer from 1 to 3, A and $A^1$ are lower alkyl or phenyl.

6. The process of claim 4, wherein $NH_2-M-NH_2$ is selected from the group consisting of metaphenylene diamine, paraphenylene diamine, 4,4′-diamino-diphenyl propane, 4,4′-diamino-diphenyl methane, benzidine, 4,4′-diamino-diphenyl sulfide, 4,4′-diamino-diphenyl sulfone, 3,3′ - diamino - diphenyl sulfone, 4,4′-diamino - diphenyl ether, 2,6-diamino-pyridine, bis-(4-amino-phenyl)diethyl silane, bis-(4-amino-phenyl)diphenyl silane, 3,3′-dichlorobenzidine, bis-(4-amino-phenyl)ethyl phosphine oxide, bis-(4-amino-phenyl) phenyl phosphine oxide, bis-(4-amino-phenyl)-N-phenyl amine, bis-(4-amino-phenyl)-N-methyl amine, 1,5-diamino-naphthalene, 3,3′-dimethyl-4,4′ - diamino - biphenyl, 3,4′-dimethyl-3′,4-diamino-biphenyl, 3,3′ - dimethoxy - benzidine, 2,4 - bis($\beta$-amino-t-butyl)toluene, bis - (para - $\beta$-amino-t-butyl-phenyl)ether, para-bis-(2-methyl-4-amino-pentyl)benzene, para-bis-(1,1-dimethyl-5-amino-pentyl)benzene, m-xylylene diamine, p-xylylene diamine, 1,3-diamino adamantane, 3,3′-diamino-1,1′ - diadamantane, 3,3′ - diaminomethyl-1,1′-diadamantane, bis(para-amino-cyclohexyl) methane, hexamethylene diamine, heptamethylene diamine, octamethylene diamine, nonamethylene diamine, decamethylene diamine, 3-methylheptamethylene diamine, 4,4 - dimethylheptamethylene diamine, 2,11 - diamino - dodecane, 1,2-bis(3-amino-propoxy) ethane, 2,2-dimethyl propylene diamine, 3-methoxy-hexamethylene diamine, 2,5-dimethylhexamethylene diamine, 2,5-dimethylheptamethylene diamine, 5-methylnonamethylene diamine, 1,1-diaminocyclohexane, 1,12-diamino-octadecane, 2,5 - diamino - 1,3,4-oxadiazole, 2,2-bis(4-aminophenyl)hexafluoro propane, N-(3-aminophenyl) - 4-aminobenzamide, 4,4′-diamino-benzophenone, and 4-aminophenyl-3-amino benzoate.

7. The process of claim 4, wherein there is used at least an ester as defined therein, in which $R^1$ is the hydrogen atom and the reaction is started with the monomers dissolved in a polar solvent at a temperature from 150 to 250° C.

8. The process of claim 4, wherein there is used at least an ester as defined therein, in which $R^1$ is the hydrogen atom and the reaction is started with molten monomers at a temperature from 150 to 400° C.

9. The process of claim 4, wherein there is used at least an ester as defined therein in which $R^1$ is a monovalent hydrocarbon radical and the reaction is started with molten monomers at a temperature from 200 to 300° C.

10. The process of claim 4 wherein the reaction is terminated at a temperature from 200 to 400° C. under reduced pressure or in an inert atmosphere.

11. A process for manufacturing an aromatic polyimide as defined by claim 1, comprising reacting, at a temperature above 100° C. and in a polar solvent, a tetracarboxylic acid of one of the formulae:

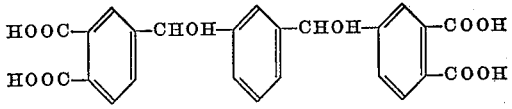

and

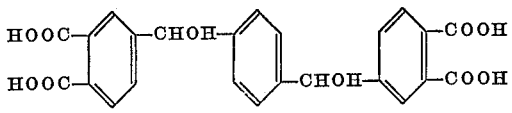

with at least one primary diamine of the formula $$NH_2—M—NH_2$$

in which M is selected from aliphatic, alicyclic, carbocyclic and heterocyclic aromatic and alkyl aromatic divalent radials non-interfering with the reaction, or with a N,N' diacyl derivative thereof.

12. A solution of an aromatic polyimide as defined by claim 1 dissolved in an inert organic solvent.

References Cited
UNITED STATES PATENTS 3,609,123  9/1971  Rabilloud et al. ____ 260—78 X HOWARD E. SCHAIN, Primary Examiner U.S. Cl. X.R.

117—124 E, 161 P, 161—197, 214; 260—30.2, 30.4 N, 30.6 R, 30.8 DS, 32.6 N, 33.4 P, 63 R, 78 TF